No. 748,648. PATENTED JAN. 5, 1904.
F. J. PIOCH.
STOVE.
APPLICATION FILED FEB. 27, 1903.
NO MODEL. 2 SHEETS—SHEET 1.

WITNESSES:
H. Walker
W. Harrison

INVENTOR
Frank J. Pioch

ATTORNEYS.

No. 748,648. PATENTED JAN. 5, 1904.
F. J. PIOCH.
STOVE.
APPLICATION FILED FEB. 27, 1903.
NO MODEL. 2 SHEETS—SHEET 2.
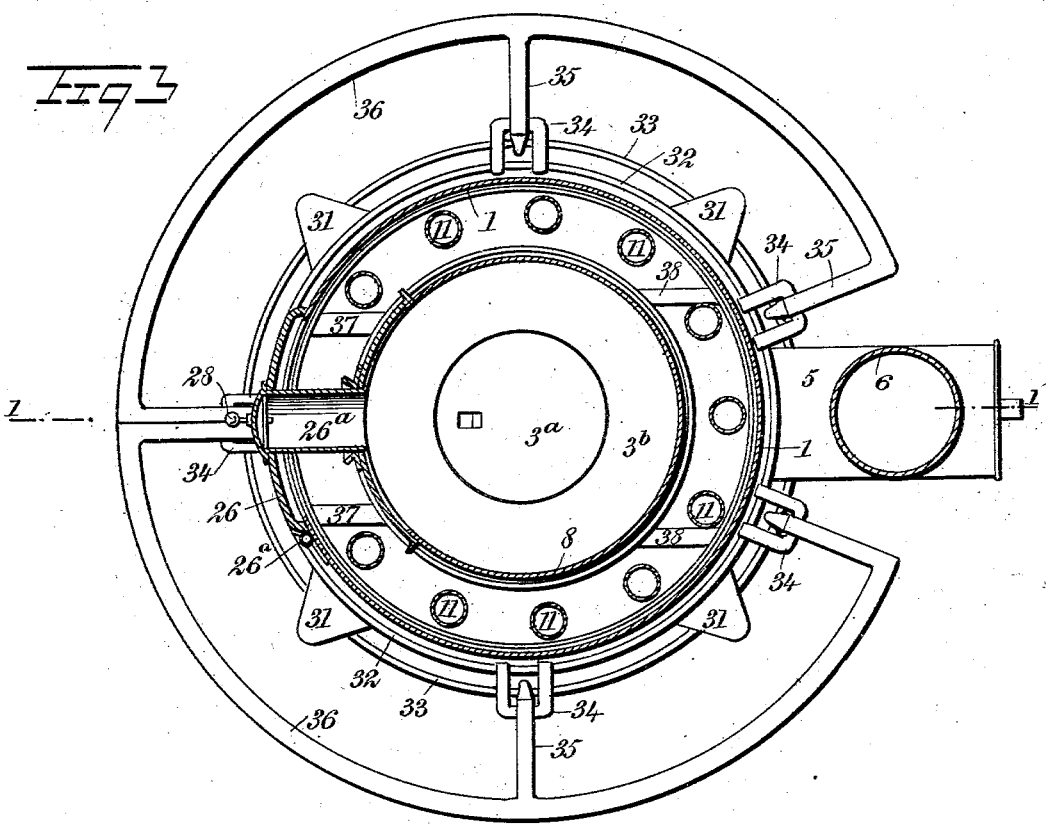
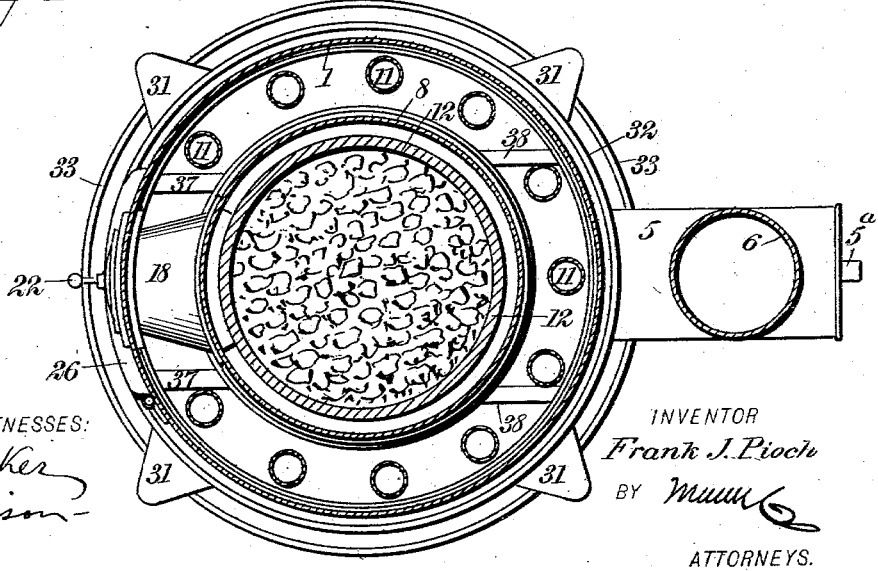
WITNESSES:
H. Walker
W. Harrison
INVENTOR
Frank J. Pioch
BY Munn
ATTORNEYS.

No. 748,648. Patented January 5, 1904.

UNITED STATES PATENT OFFICE.

FRANK J. PIOCH, OF CRESTON, IOWA.

STOVE.

SPECIFICATION forming part of Letters Patent No. 748,648, dated January 5, 1904.

Application filed February 27, 1903. Serial No. 145,312. (No model.)

*To all whom it may concern:*

Be it known that I, FRANK J. PIOCH, a citizen of the United States, and a resident of Creston, in the county of Union and State of Iowa, have invented a new and Improved Stove, of which the following is a full, clear, and exact description.

My invention relates to a center-draft base heating-stove, having for its object efficiency in heating and in ventilating the fire, easy removal of ashes, and various other objects, as hereinafter described.

Reference is to be had to the accompanying drawings, forming a part of this specification, in which similar characters of reference indicate corresponding parts in all the figures.

Figure 1:
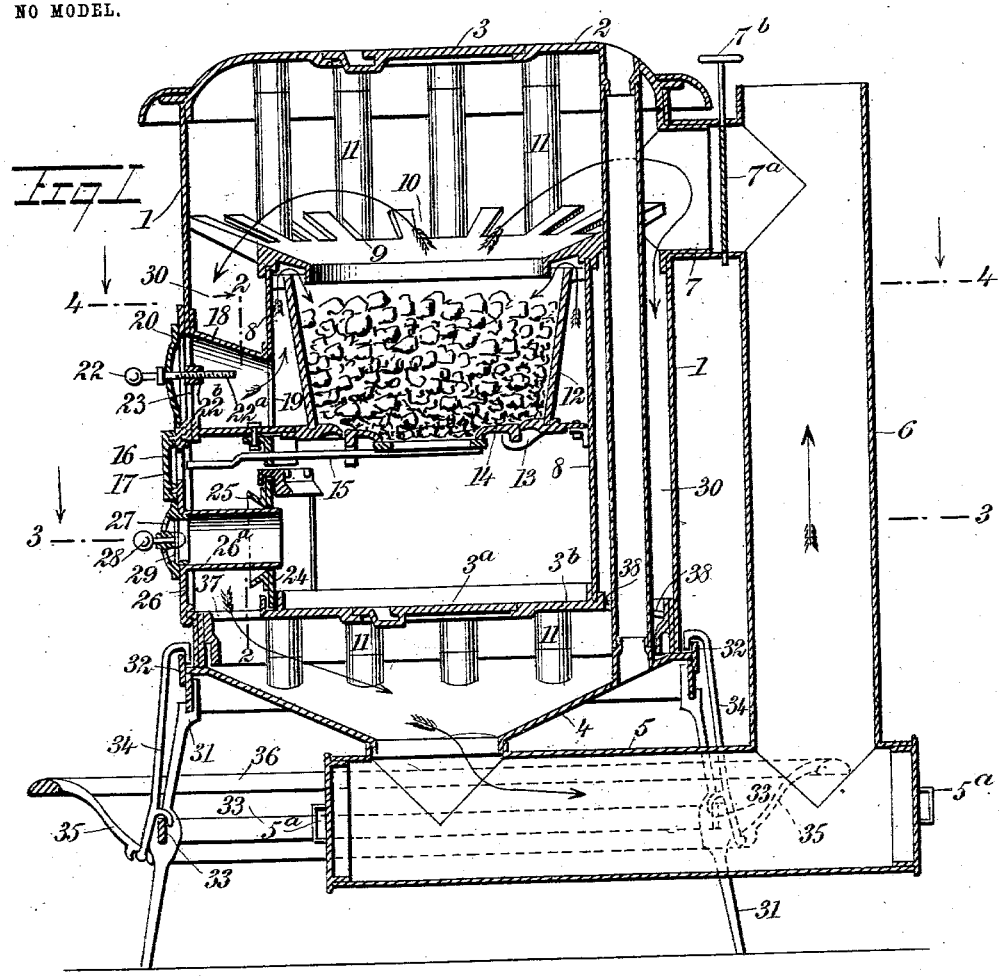
Figure 2:
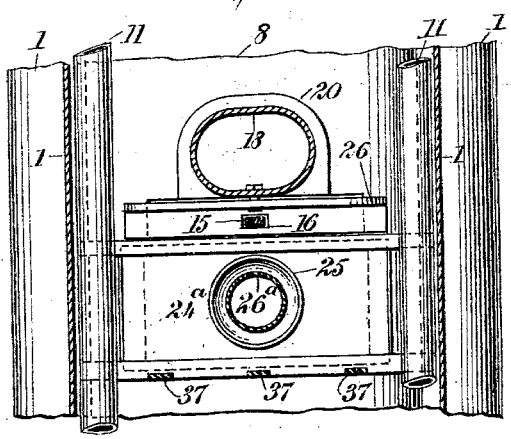

Figure 1 is a central vertical section through the stove complete on the line 1 1 of Fig. 3. Fig. 2 is a fragmentary section upon the line 2 2 of Fig. 1 looking in the direction of the arrow. Fig. 3 is a horizontal section upon the line 3 3 of Fig. 1 looking in the direction of the arrow, and Fig. 4 is a horizontal section upon the line 4 4 of Fig. 1 looking in the direction of the arrow.

An outer shell 1 is provided with a top 2 or upper closure-lid and an ash-pan $3^b$, provided with a lid $3^a$. Connected with the bottom of the outer shell is a funnel-shaped member 4, communicating with a receptacle 5, which may be opened and closed by means of the removable ends $5^a$, which are provided with handles for the purpose, as shown. The smoke-pipe 6 is connected with the receptacle 5 and is also connected by means of a short tubular member 7 with the outer shell 1. A damper $7^a$ is disposed within the tubular member 7 and may be manipulated by means of a handpiece $7^b$ for the purpose of controlling the draft from the upper portion of the outer shell 1 to the smoke-pipe. A hollow member 8, having preferably a cylindrical form, as shown, is mounted within the outer shell 1.

Fitted upon the top of the hollow member 8 is a hot-blast ring 9, provided with radiating slots, through divers of which pass the open-ended pipes 11, which communicate freely with the air above and below the stove. Disposed within the hollow member 8 is a fire-pot 12, provided at its bottom with supports 13 for the movable grate 14. Connected with this grate is a lever or shaker-bar 15 for the purpose of manipulating the grate, thereby facilitating the removal of ashes, stirring the fire, &c.

The outer shell 1 is provided with an aperture 16, disposed adjacent to the position normally occupied by the shaker-bar 15. This aperture 16 may be closed by a removable door 17 when it is desirable to obstruct the draft otherwise passing through the aperture 16. A substantially frusto-conical tubular member 18 is connected with the outer shell 1 and with the hollow member 8, so as to permit a steady flow of air from the outer atmosphere into the hollow member 8. A plate 20 is rigidly mounted upon a threaded stem $22^a$, which is revolubly mounted in a threaded bearing $22^b$, supported by a spider 23, through which air may pass when the plate 20 is spaced a proper distance therefrom. By turning a knob 22 on the stem $22^a$, thereby moving the plate 20 toward or from the body of the stove, the supply of air through the spider 23 may be regulated at will. A sliding door 24 normally closes a large aperture $24^a$, made by cutting away a portion at the lower end of the hollow member 8, as indicated in Fig. 2. This sliding gate 24 is provided with a trumpet-like opening 25. A swinging door 26 is mounted upon the outer shell 1 and is free to open and close at will. Mounted upon this swinging door 26 is a plate 27, into which is revolubly fitted a knob 28, carrying a shut-off 29, somewhat similar to the one above described. The swinging door 26 likewise carries a tubular draft member $26^a$, which enters the trumpet-like opening 25 when the door is closed—that is to say, the tubular draft member $26^a$ is practically a part of the swinging door. The sliding door 24 should of course be closed, so that the trumpet-shaped opening 25 will occupy its normal position before the swinging door is closed for the reason that the tubular member $26^a$ should register approximately, so that the trumpet-shaped opening 25 above the door 26 can be closed. The tubular member $26^a$ normally communicates with the open air and is used to supply air to the lower part of the fire, the supply of air being regulated by means of the knob 28.

As the hollow member 8 is disposed concentric to the outer shell 1, a space 30 is formed intermediate of these parts, and through this space a downdraft is produced, so that the heated gases of combustion intermingle with the smoke passed downwardly, as indicated by the arrows, through the funnel-shaped member 4 and the receptacle 5 up into the smoke-pipe 6. In starting a fire, however, it may be desirable to have a comparatively powerful draft, the general heating effect of the stove being ignored for the moment. When this is the case, the damper $7^a$ is turned by means of the handpiece $7^b$, so that the gases of combustion pass directly from the fire-pot 12 through the tubular member 7 and up into the smoke-pipe. If the fire is sufficiently under way, the damper $7^a$ may be gradually or abruptly turned so as to cut off the draft through the tubular member 7 and to start up the downdraft through the funnel-shaped member 4. When it is desirable to admit air to the top of the fire, the knob 22 is turned so as to permit the air to pass through the member 18 and opening 19, following a direction of the arrows and passing through the hot-blast ring 9 directly into the fire contained within the fire-pot 12. If desired, however, the knob 22 may be so turned as to cut off the entrance of air through the tubular member 18, and the knob 28 may be so turned as to permit any desired quantity of air to enter through the tubular member $26^a$. It will be seen, therefore, that by means of the two knobs 22 28 and the handpiece $7^b$ the fire may be regulated to a nicety in several independent respects.

The object in having the gases of combustion normally pass downward around the hollow member 8 and through the funnel-shaped outlet 4 is to thoroughly distribute the heat—that is to say, all of the heated gases are conducted by a circuitous route down to the bottom of the stove and thence upward to the smoke-pipe, thereby virtually increasing the radiating-space used in heating and temporarily holding the gases in the stove until they have radiated a proper proportion of the heat which they contain.

The ash-pit is formed in the lower portion of the hollow member 8, the ash-pan being the principal factor used. To empty the stove of its ashes, the swinging door 26 is opened, carrying with it, of course, the tubular member $26^a$. The sliding door 24 is now pushed to the right or left, so as to open the aperture $24^a$, and the ashes are removed by means of a shovel in the usual manner. Should it happen that any smoke, cinders, or soot should lodge in the outer shell 1 or upon the funnel-shaped member 4, the action of gravity accompanied, perhaps, by a slight jarring readily removes the substances thus deposited into the receptacle 5, from which the substances may be taken at will by removing the ends $5^a$ of the receptacle, as will be readily understood from Fig. 1. If desired, the lid $3^a$ may be removed and the ashes allowed to drop down into the receptacle 5, from which they may be readily removed. By this means the stove need not be emptied of its ashes as often as would otherwise be necessary.

The legs of the stove are shown at 31. Mounted upon the stove adjacent to the lower end of the shell 1 is a supporting-ring 32, and a somewhat similar supporting-ring 33 is mounted upon the legs of the stove. A number of hangers 34 are mounted upon these two rings, as indicated in Fig. 1, and resting upon these hangers are the legs 35, which support the foot-rest 36. This foot-rest is preferably made in sections, as indicated in Fig. 3. The foot-rest is employed in the usual manner, the person simply resting his feet upon the rest 36. Rods 37 38 are used for the purpose of supporting the weight of the hollow member 8 and the other parts resting thereon.

It will be observed that in the stove above described there are no idle corners in which ashes and dirt may accumulate. All loose particles have a tendency to drop down upon the funnel-shaped member 4 and are gathered into the receptacle 5.

By having air pass all around the fire-pot all danger of burning out the fire-pot is obviated and the degree of heat given to this air is very intense, thereby increasing the efficiency of the stove to a marked degree.

Having thus described my invention, I claim as new and desire to secure by Letters Patent—

1. A stove, comprising an outer shell provided at its bottom with a funnel-shaped outlet, a hollow member mounted within said shell, a fire-pot mounted within said hollow member, a receptacle connected with said funnel-shaped member for the purpose of arresting soot and ashes, and a smoke-pipe connected with said receptacle for the purpose of facilitating draft through the same.

2. A stove, comprising an outer shell provided with an aperture, a hollow member mounted within said outer shell and provided with an aperture for effecting the removal of ashes and the like, a fire-pot mounted within said hollow member, a sliding gate for opening and closing said aperture, said sliding gate being provided with an air-hole, a door mounted upon said outer shell and free to open and close said aperture in said outer shell, and a tubular draft-tube connected with said swinging door and free to register with said air-hole when said swinging door is closed.

3. A stove, comprising an outer shell, means for heating the same, legs for supporting said shell, rings mounted upon said shell and upon said legs respectively, hangers provided with hooks for engaging said rings, and a foot-rest mounted upon said hangers.

4. A stove, comprising an outer shell, means for heating the same, legs for supporting said shell, rings mounted upon said shell and upon said legs respectively, hangers provided with hooks for engaging said rings, and a foot-rest made in sections and supported by said hangers.

5. A stove, comprising an outer shell, a hollow member mounted thereon, a fire-pot mounted within said hollow member, a tubular passage connecting together said outer shell and said hollow member for the purpose of supplying air to the top of the fire, a tubular passage normally connected with said outer shell and with said hollow member for supplying air to the bottom of said fire, means, controllable at will, for regulating the supply of air through said tubular passages respectively, and means for drawing the gases of combustion from said fire-pot downward around said hollow member.

In testimony whereof I have signed my name to this specification in the presence of two subscribing witnesses.

FRANK J. PIOCH.

Witnesses:
E. E. EDGERTON,
R. B. CORDER.